(12) United States Patent
Jeon

(10) Patent No.: US 11,491,781 B2
(45) Date of Patent: Nov. 8, 2022

(54) APPARATUS FOR ALIGNING HEAD MODULE AND SYSTEM FOR TREATING SUBSTRATE WITH THE APPARATUS

(71) Applicant: SEMES CO., LTD., Chungcheongnam-do (KR)

(72) Inventor: Su Beom Jeon, Chungcheongnam-do (KR)

(73) Assignee: Semes Co., Ltd., Chungcheongnam-do (KR)

( * ) Notice: Subject to any disclaimer, the term of this patent is extended or adjusted under 35 U.S.C. 154(b) by 21 days.

(21) Appl. No.: 17/337,966

(22) Filed: Jun. 3, 2021

(65) Prior Publication Data

US 2021/0387450 A1 Dec. 16, 2021

(30) Foreign Application Priority Data

Jun. 11, 2020 (KR) .................. 10-2020-0070702

(51) Int. Cl.
*B41J 2/04* (2006.01)
*B41J 2/045* (2006.01)
*B41J 2/145* (2006.01)

(52) U.S. Cl.
CPC .......... *B41J 2/04505* (2013.01); *B41J 2/145* (2013.01)

(58) Field of Classification Search
CPC .... B41J 2/04505; B41J 2/145; B41J 25/3082; B41J 29/02; B41J 2/2142; B41J 2/14048; B41J 2/14153; B41J 2202/20; B41J 2002/14185; B41J 2002/14475; G06K 15/027; G02F 1/133354

See application file for complete search history.

(56) References Cited

U.S. PATENT DOCUMENTS

| | | | |
|---|---|---|---|
| 6,213,580 B1 * | 4/2001 | Segerstrom | B41J 2/0057 347/19 |
| 2010/0002051 A1 * | 1/2010 | Yoshimura | B41J 2/15 347/40 |
| 2017/0274653 A1 * | 9/2017 | Shimazoe | B41J 2/155 |

* cited by examiner

*Primary Examiner* — Kristal Feggins
(74) *Attorney, Agent, or Firm* — RatnerPrestia

(57) ABSTRACT

A head alignment apparatus for determining a reference position using position synchronization and aligning a plurality of head modules according to the reference position, and a substrate treating system including the same are provided. The head alignment apparatus may include, a reference position determining unit for determining a first reference position of a head transfer, in which a plurality of inkjet head modules are installed; and a mounting position determining unit for determining a second reference position of the inkjet head module based on the first reference position so that the inkjet head module can be moved from a current position to a second reference position, wherein the reference position determining unit determines a first reference position using a first image sensor installed on the same plane as the inkjet head module and a second image sensor installed facing the inkjet head module.

20 Claims, 14 Drawing Sheets

[FIG. 1]
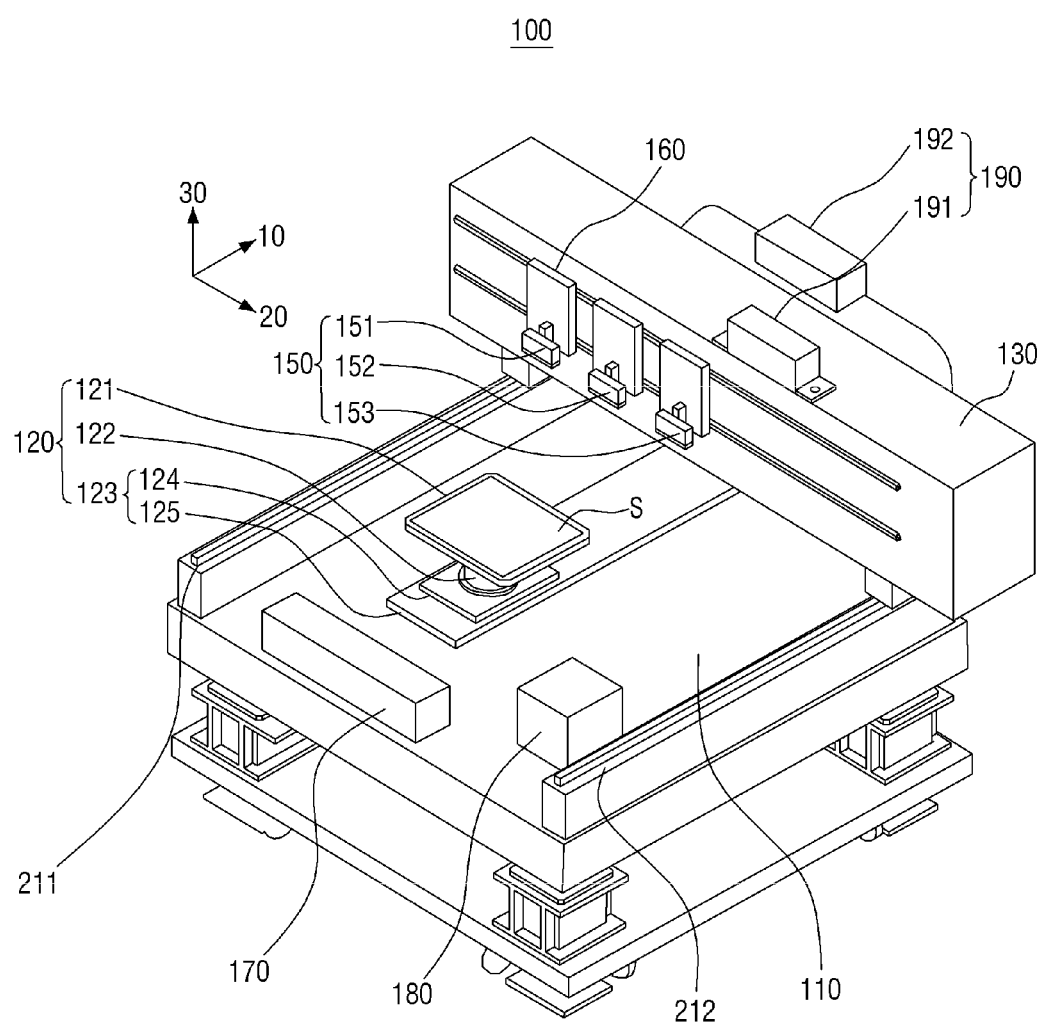

[FIG. 2]
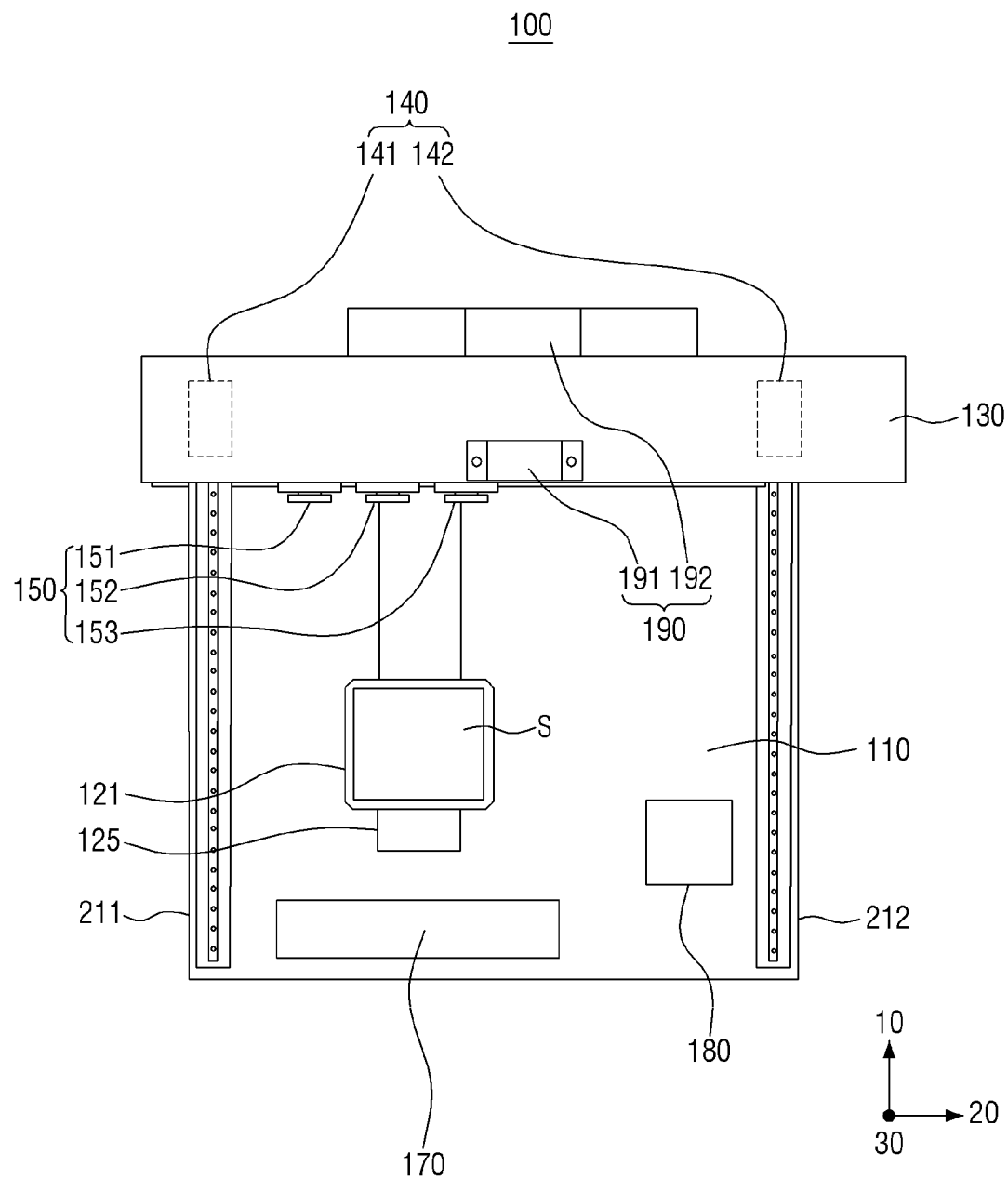

[FIG. 3]
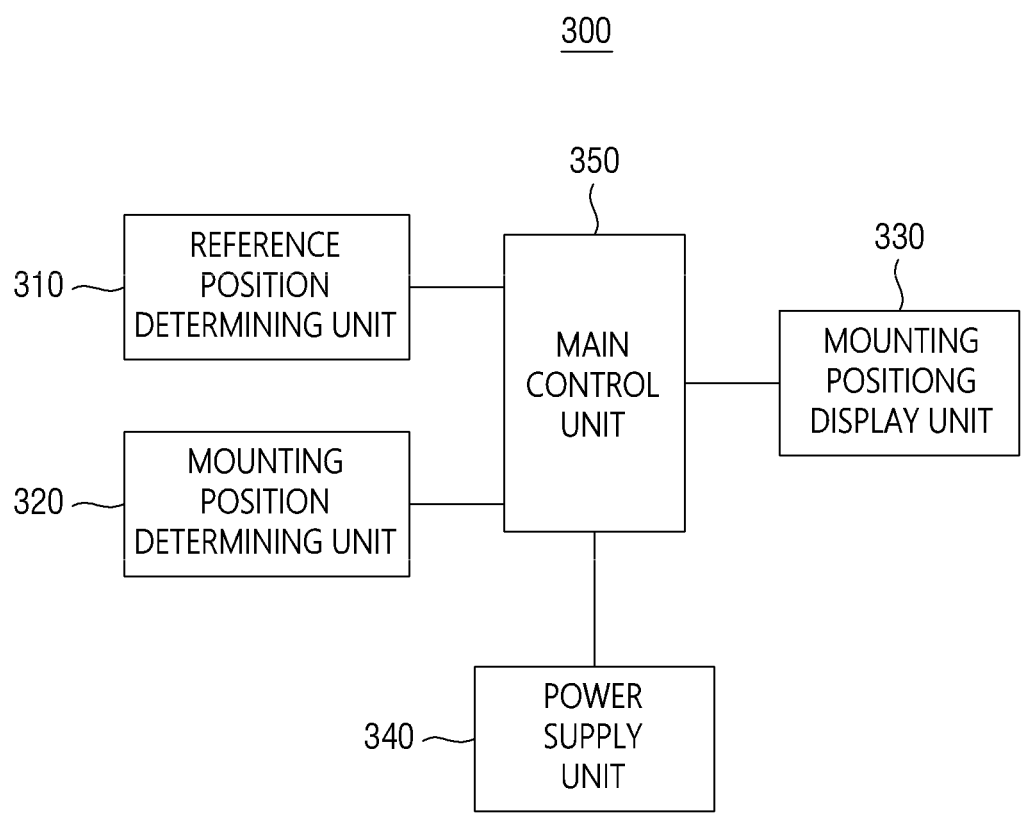

[FIG. 4]
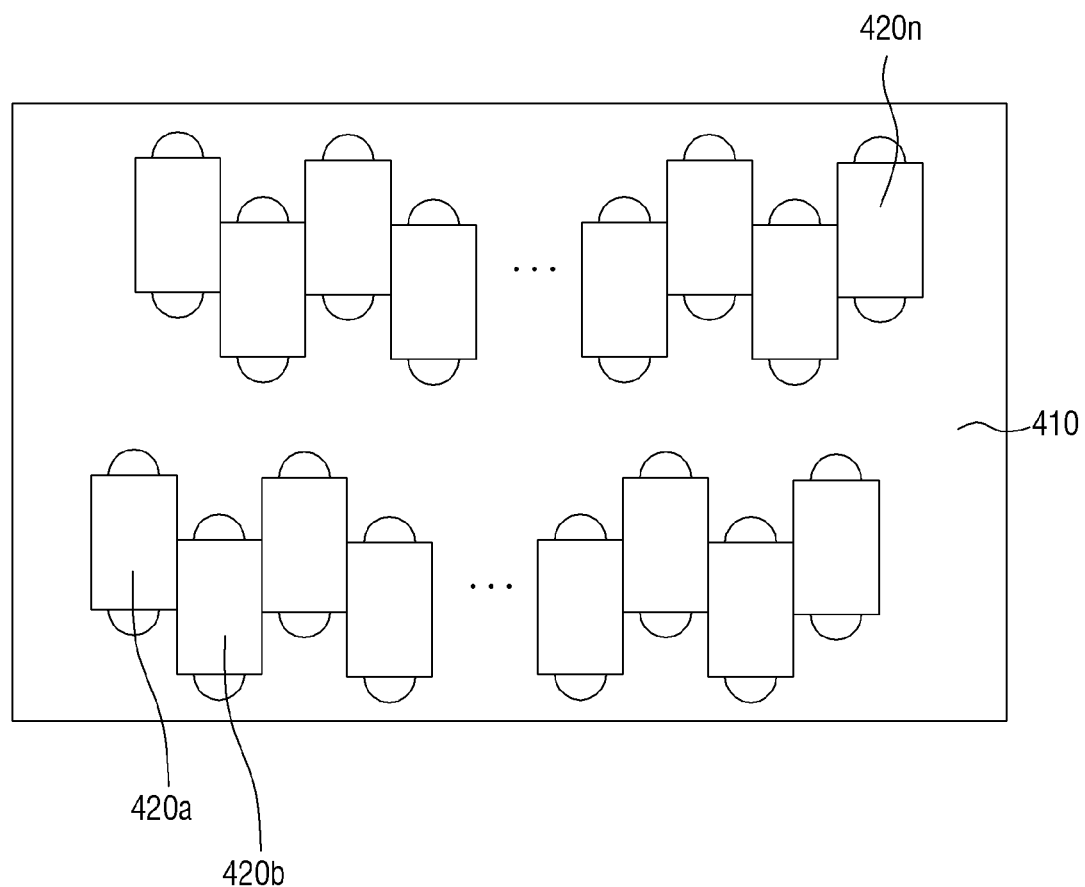

[FIG. 5]
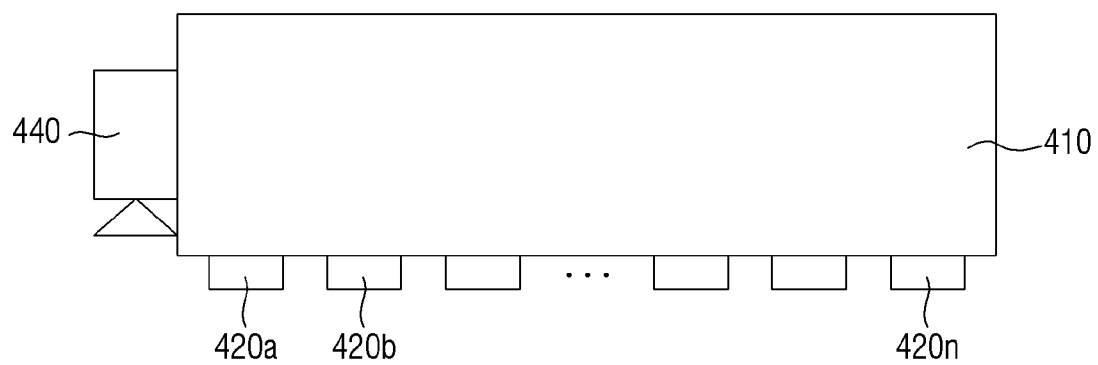
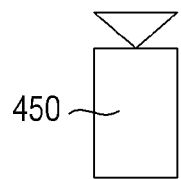
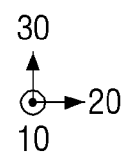

[FIG. 6]
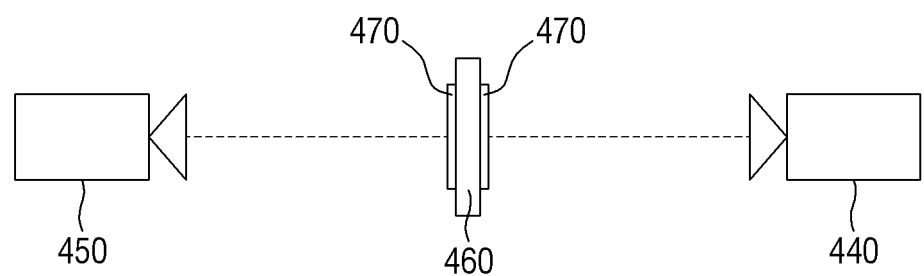
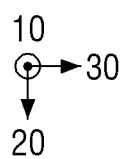

[FIG. 7]
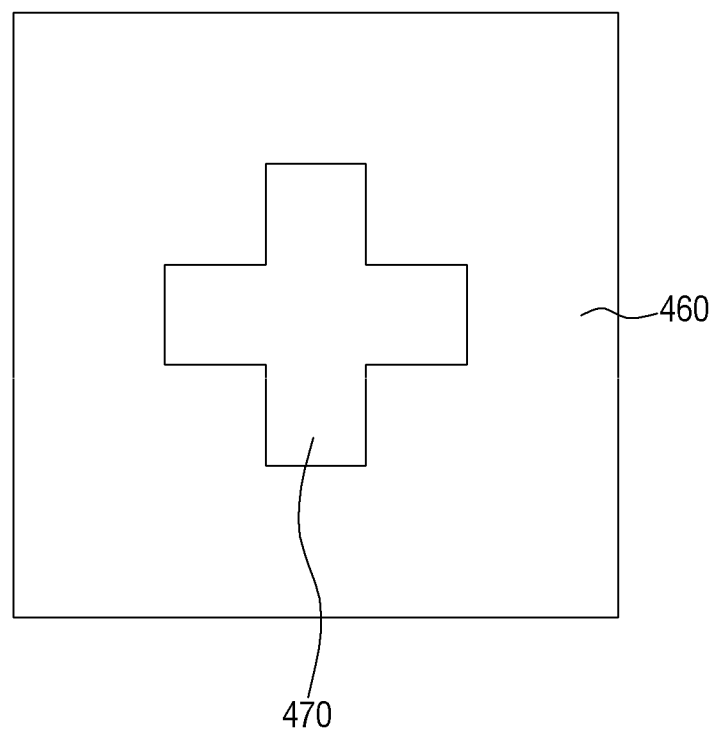

[FIG. 8]
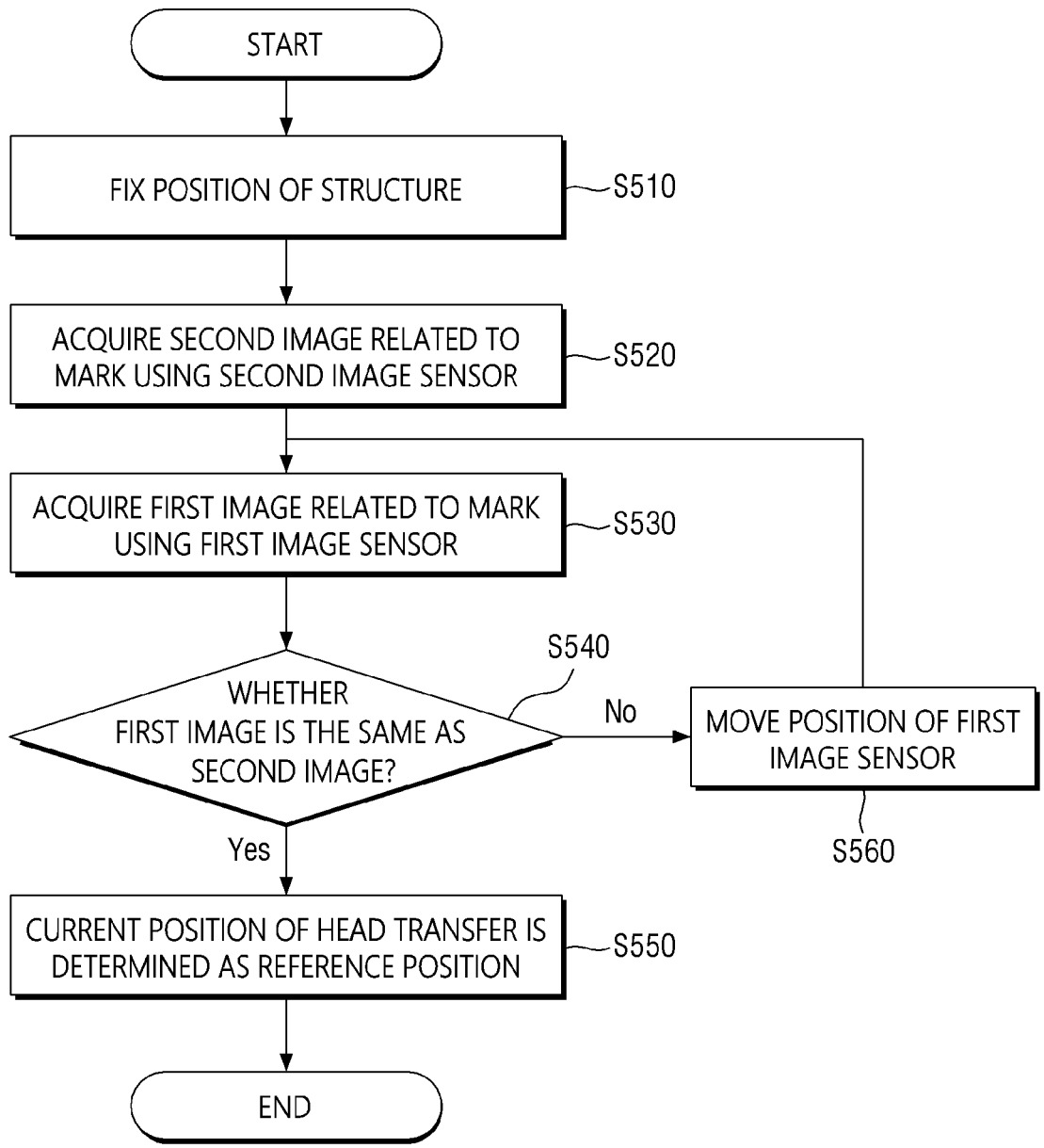

[FIG. 9]
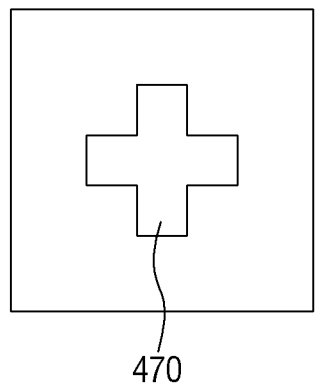 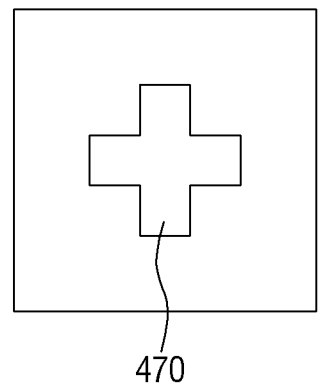
480           490
470           470

[FIG. 10]
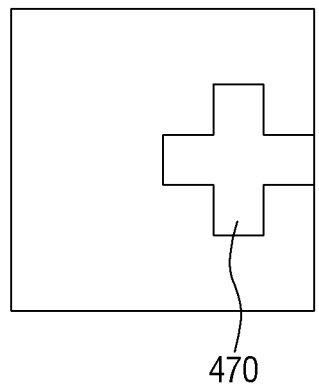 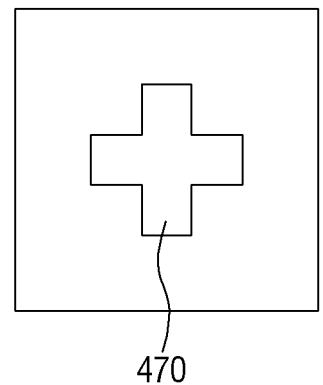

[FIG. 11]
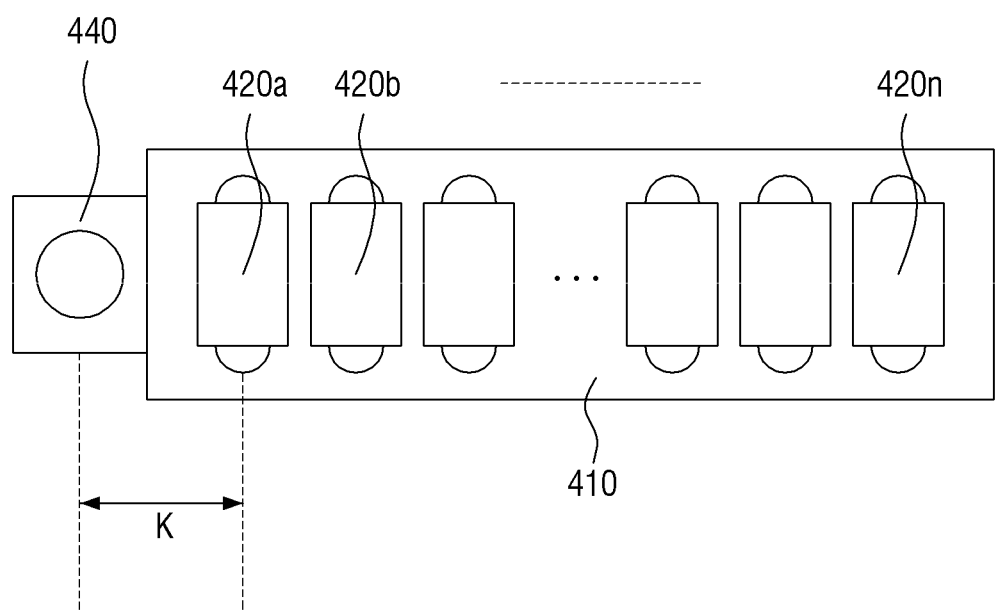
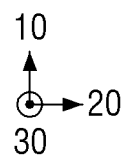

[FIG. 12]
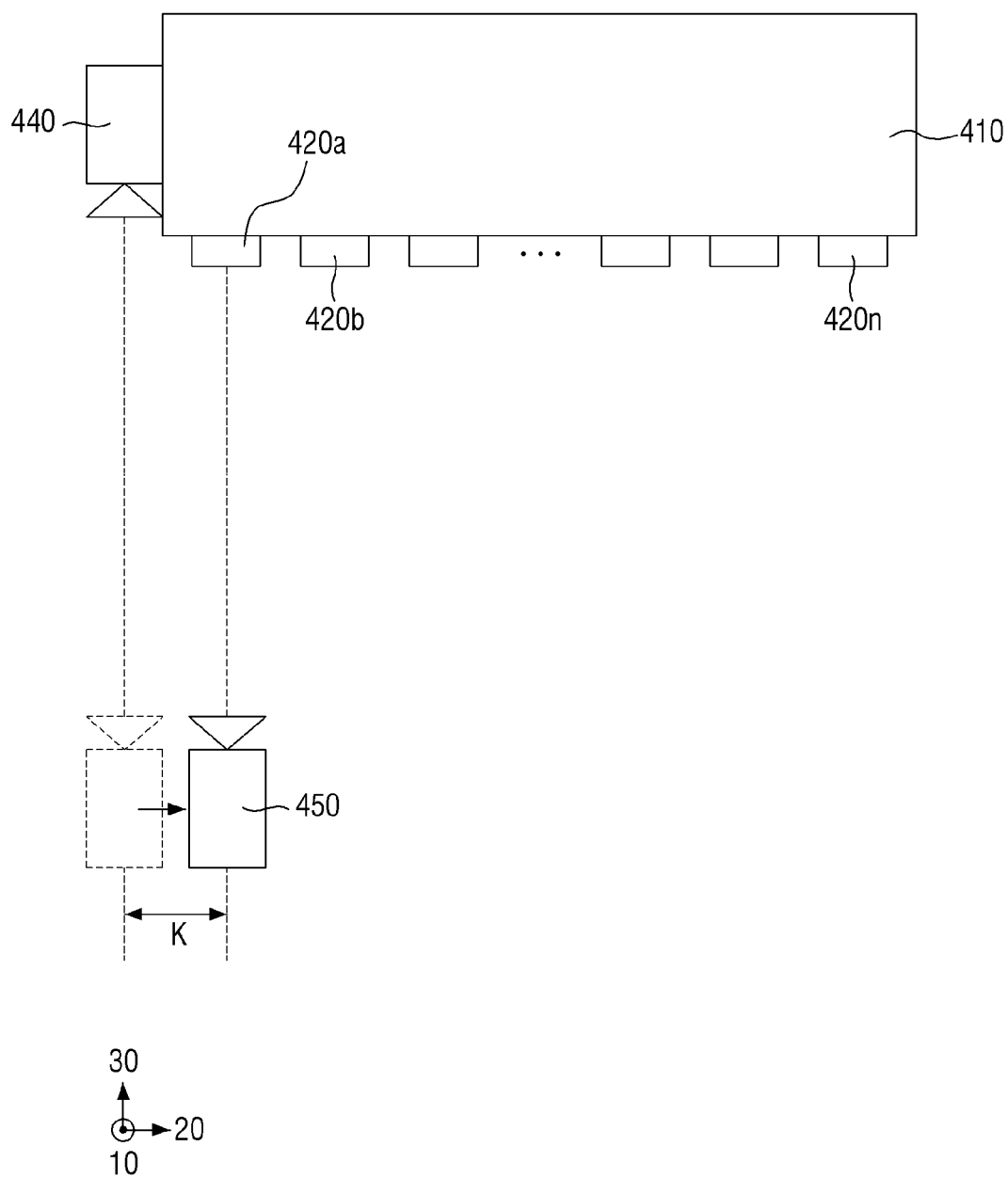

[FIG. 13]
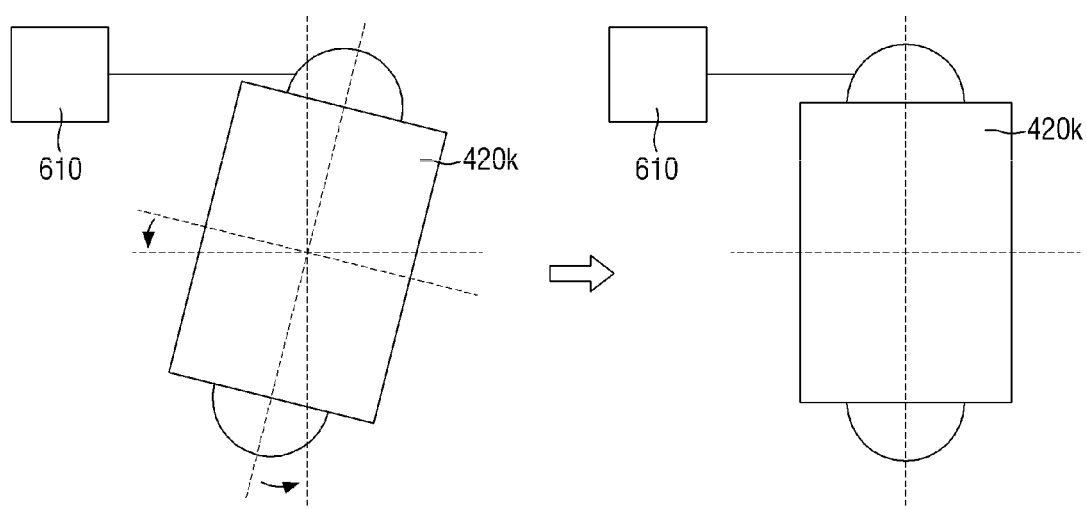

[FIG. 14]
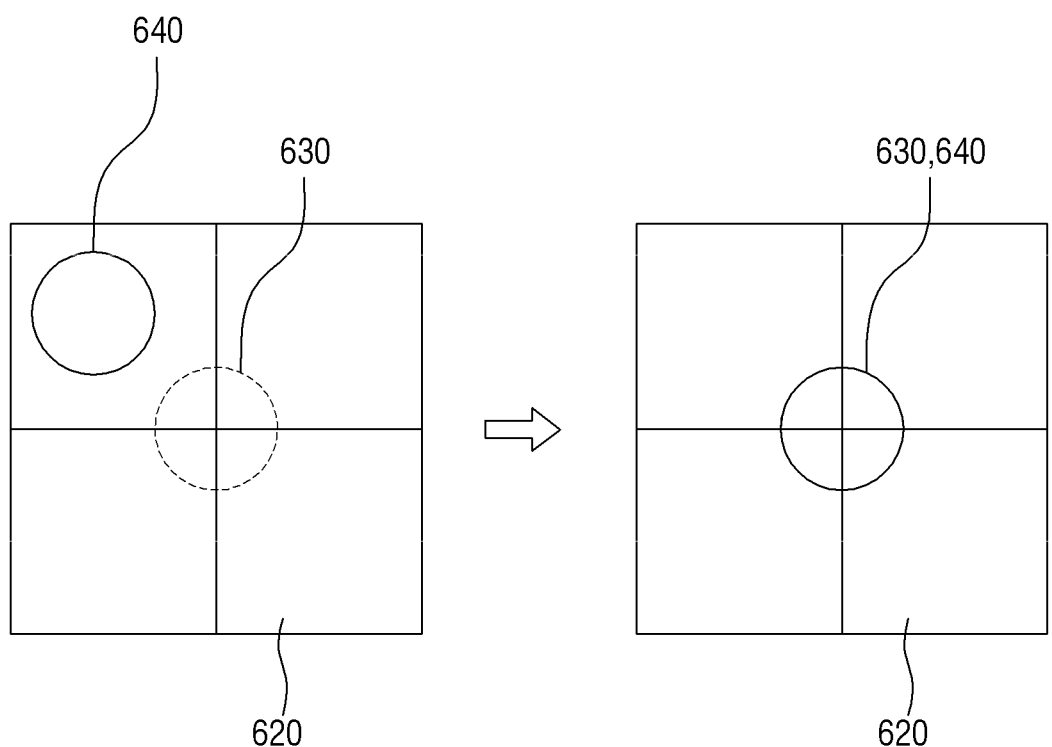

APPARATUS FOR ALIGNING HEAD MODULE AND SYSTEM FOR TREATING SUBSTRATE WITH THE APPARATUS

CROSS REFERENCE TO RELATED APPLICATION

This application claims the benefit of Korean Patent Application No. 10-2020-0070702, filed on Jun. 11, 2020, in the Korean Intellectual Property Office, the disclosure of which is incorporated herein by reference in its entirety.

FIELD OF THE INVENTION

The present invention relates to a head alignment apparatus for aligning a head module and a substrate treating system having the same. More particularly, it relates to a head alignment apparatus for aligning inkjet head modules, and a substrate treating system having the same.

BACKGROUND OF THE INVENTION

When performing a printing process (for example, RGB patterning) on a transparent substrate to manufacture display devices such as LCD panels, PDP panels, and LED panels, printing process equipment having an inkjet head module may be used.

SUMMARY OF THE INVENTION

The printing process equipment may be provided with a plurality of inkjet head modules for large area printing and the like. However, conventionally, when performing the head setting for head alignment, the process of checking the position after mounting the head, and if the mounting position of the head is not correct, remounting the head and confirming the position is repeated.

However, when the head setting is performed in this way, the following problems may occur. First, it can take a lot of time to complete the task. Second, depending on the skill level of the operator, variations in mounting precision may occur, and the time it takes to complete the work may vary. Third, when setting a plurality of heads, errors may accumulate, and accordingly, the quality of the printing process equipment may be deteriorated, and it may be difficult to secure the performance of the printing process equipment.

An object to be solved in the present invention is to provide a head alignment apparatus for determining a reference position using position synchronization and aligning a plurality of head modules according to the reference position, and a substrate treating system having the same.

The problems of the present invention are not limited to the problems mentioned above, and other problems that are not mentioned will be clearly understood by those skilled in the art from the following description.

One aspect of the head alignment apparatus of the present invention for achieving the above object comprises a reference position determining unit for determining a first reference position of a head transfer, in which a plurality of inkjet head modules are installed; and a mounting position determining unit for determining a second reference position of the inkjet head module based on the first reference position so that the inkjet head module can be moved from a current position to the second reference position, wherein the reference position determining unit determines the first reference position using a first image sensor installed on the same plane as the inkjet head module and a second image sensor installed facing the inkjet head module.

Wherein the reference position determining unit may determine the first reference position based on position synchronization between the first image sensor and the second image sensor.

Wherein the reference position determining unit may determine the first reference position using a structure having a mark attached to a surface of the structure.

Wherein the first image sensor may acquire a first image of a structure having a mark attached to a surface of the structure, the second image sensor may acquire a second image of the structure, and the reference position determining unit may determine the first reference position based on whether the first image is the same as the second image.

Wherein the reference position determining unit may compare a position of the mark on the first image and a position of the mark on the second image to determine whether the first image is the same as the second image.

Wherein the reference position determining unit may move the first image sensor to determine the first reference position if the first image is not the same as the second image.

Wherein the structure may be arranged between the first image sensor and the second image sensor when synchronizing between a position of the first image sensor and a position of the second image sensor.

Wherein the structure may be made of a transparent material.

Wherein the mounting position determining unit may determine the second reference position by adding a first reference value to the first reference position.

Wherein the mounting position determining unit may determine, based on a second reference position of one of a plurality of inkjet head modules, a second reference position of other inkjet head module.

Wherein the mounting position determining unit may determine a second reference position of the other inkjet head module by adding a second reference value to the second reference position of the one of a plurality of inkjet head modules.

The apparatus may further comprise a mounting position display unit for visually displaying the current position and the second reference position when the inkjet head module is moved from the current position to the second reference position.

Wherein the mounting position display unit may simultaneously display the current position and the second reference position on one screen.

Another aspect of the head alignment apparatus of the present invention for achieving the above object comprises a reference position determining unit for determining a first reference position of a head transfer, in which a plurality of inkjet head modules are installed; and a mounting position determining unit for determining a second reference position of the inkjet head module based on the first reference position so that the inkjet head module can be moved from a current position to the second reference position, wherein the reference position determining unit determines the first reference position based on position synchronization between a first image sensor installed on the same plane as the inkjet head module and a second image sensor installed facing the inkjet head module, wherein, when a first image of a structure arranged between the first image sensor and the second image sensor is acquired by the first image sensor, and a second image of the structure is acquired by the second image sensor, the reference position determining unit determines whether the first image is the same as the second image based on positions of the mark on the images.

One aspect of the substrate treating system of the present invention for achieving the above object comprises a base; a substrate support member installed on the base and for supporting a substrate to be printed; a gantry unit installed to be movable on the substrate support member and in which, a head transfer including a plurality of inkjet head modules for discharging a droplet on the substrate is installed; and a head alignment apparatus for aligning the inkjet head module, wherein the head alignment apparatus comprises, a reference position determining unit for determining a first reference position of the head transfer; and a mounting position determining unit for determining a second reference position of the inkjet head module based on the first reference position so that the inkjet head module can be moved from a current position to the second reference position, wherein the reference position determining unit determines the first reference position using a first image sensor installed on the same plane as the inkjet head module and a second image sensor installed facing the inkjet head module.

Details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which:

FIG. 1 is a perspective view schematically showing an internal structure of a substrate treating system;

FIG. 2 is a plan view schematically showing an internal structure of a substrate treating system;

FIG. 3 is a conceptual diagram schematically showing an internal configuration of a head alignment apparatus according to an embodiment of the present invention;

FIG. 4 is an exemplary view for describing a head transfer;

FIG. 5 is an exemplary view for describing the function of a reference positioning determining unit constituting the head alignment apparatus according to an embodiment of the present invention;

FIG. 6 is a first exemplary view for describing a method of synchronizing positions between a first image sensor and a second image sensor;

FIG. 7 is a second exemplary view for describing a method of synchronizing positions between a first image sensor and a second image sensor;

FIG. 8 is a flowchart sequentially illustrating a method of synchronizing positions between a first image sensor and a second image sensor;

FIG. 9 is a third exemplary view for describing a method of synchronizing positions between a first image sensor and a second image sensor;

FIG. 10 is a fourth exemplary view for describing a method of synchronizing positions between a first image sensor and a second image sensor;

FIG. 11 is a first exemplary view for describing the function of the mounting position determining unit constituting the head alignment apparatus according to an embodiment of the present invention;

FIG. 12 is a second exemplary view for describing the function of the mounting position determining unit constituting the head alignment apparatus according to an embodiment of the present invention;

FIG. 13 is a first exemplary view for describing the function of a mounting position determining unit constituting the head alignment apparatus according to an embodiment of the present invention; and FIG. 14 is a second exemplary view for describing the function of the mounting position determining unit constituting the head alignment apparatus according to an embodiment of the present invention.

DETAILED DESCRIPTION OF THE INVENTION

Hereinafter, preferred embodiments of the present invention will be described in detail with reference to the accompanying drawings. Advantages and features of the present invention, and methods for achieving them will be clarified with reference to embodiments described below in detail together with the accompanying drawings. However, the present invention is not limited to the embodiments disclosed below, but may be implemented in various different forms, and only the embodiments allow the publication of the present invention to be complete, and are provided to fully inform those skilled in the technical field to which the present invention pertains of the scope of the invention, and the invention is only defined by the scope of the claims. The same reference numerals refer to the same elements throughout the specification.

When elements are referred to as "on" or "above" of other elements, it includes not only when directly above of the other elements, but also other elements intervened in the middle. On the other hand, when elements are referred to as "directly on" or "directly above," it indicates that no other element is intervened therebetween.

The spatially relative terms "below," "beneath," "lower," "above," "upper," etc., as shown in figures, can be used to easily describe the correlation of components or elements with other components or elements. The spatially relative terms should be understood as terms including the different direction of the element in use or operation in addition to the direction shown in the figure. For example, if the element shown in the figure is turned over, an element described as "below" or "beneath" the other element may be placed "above" the other element. Accordingly, the exemplary term "below" can include both the directions of below and above. The element can also be oriented in other directions, so that spatially relative terms can be interpreted according to the orientation.

Although the first, second, etc. are used to describe various components, elements and/or sections, these components, elements and/or sections are not limited by these terms. These terms are only used to distinguish one component, element, or section from another component, element or section. Therefore, first component, the first element or first section mentioned below may be a second component, second element, or second section within the technical spirit of the present invention.

The terminology used herein is for describing the embodiments and is not intended to limit the present invention. In the present specification, the singular form also includes the plural form unless otherwise specified in the phrase. As used herein, "comprises" and/or "comprising" means that the elements, steps, operations and/or components mentioned above do not exclude the presence or additions of one or more other elements, steps, operations and/or components.

Unless otherwise defined, all terms (including technical and scientific terms) used in the present description may be used with meanings that can be commonly understood by those of ordinary skill in the art to which the present invention belongs. In addition, terms defined in a commonly used dictionary are not interpreted ideally or excessively unless explicitly defined specifically.

Hereinafter, exemplary embodiments of the present invention will be described in detail with reference to the accompanying drawings, and in the description with reference to the accompanying drawings, the same or corresponding elements are assigned the same reference numbers regardless of reference numerals, and the description overlapped therewith will be omitted.

The present invention relates to a head alignment apparatus for aligning a plurality of head modules provided in a substrate treating system (e.g., printing process equipment), and a substrate treating system having the same.

The head alignment apparatus according to the present invention determines a reference position using position synchronization, and determines mounting positions and spacing for a plurality of head modules according to this reference position, thereby aligning a plurality of head modules.

According to the present invention, it is possible to improve the mounting precision for each head module, and accordingly, it becomes possible to ensure the quality and performance of the printing process equipment. Further, it is possible to shorten the time it takes to align a plurality of head modules.

Hereinafter, the present invention will be described in detail with reference to the drawings. First, a substrate treating system including a head alignment apparatus will be described.

FIG. 1 is a perspective view schematically showing an internal structure of a substrate treating system, and FIG. 2 is a plan view schematically showing an internal structure of a substrate treating system.

The substrate treating system is to treat the substrate. Such a substrate treating system may be implemented as a printing process equipment that discharges droplets onto a substrate using, for example, an inkjet head module. Hereinafter, a case where the substrate treating system is a printing process equipment will be described as an example.

According to FIGS. 1 and 2, the printing process equipment 100 may be configured to include a base 110, a substrate support unit 120, a gantry unit 130, a gantry moving unit 140, an inkjet head module 150, a head moving unit 160, a droplet discharge amount measurement unit 170 and a nozzle inspection unit 180.

The base 110 constitutes the body of the printing process equipment 100. The base 110 may be provided in a rectangular parallelepiped shape having a predetermined thickness. Meanwhile, a substrate support unit 120 may be arranged on the upper surface of the base 110.

The substrate support unit 120 supports the substrate (S). The substrate support unit 120 may include a support plate 121, on which the substrate (S) is placed.

The substrate (S) is mounted on the support plate 121. The support plate 121 may be a flat plate having a rectangular shape. Meanwhile, a rotation driving member 122 may be connected to a lower surface of the support plate 121.

The rotation driving member 122 rotates the support plate 121. The rotation driving member 122 may be implemented as a rotation motor for this purpose. The rotation driving member 122 may rotate the support plate 121 using a rotation center axis formed in a direction perpendicular to the support plate 121.

When the support plate 121 is rotated by the rotation driving member 122, the substrate (S) may also rotate along the support plate 121. For example, when the long side direction of the cell formed on the substrate (S), to which the droplet is to be applied, towards the second direction 20, the rotation driving member 122 may rotate the substrate so that the long side direction of the cell towards the first direction 10.

The linear driving member 123 linearly moves the support plate 121 and the rotation driving member 122. The linear driving member 123 may linearly move the support plate 121 and the rotation driving member 122 in the first direction 10.

The linear driving member 123 may include a slider 124 and a guide member 125. In this case, the rotation driving member 122 may be installed on the upper surface of the slider 124.

The guide member 125 may extend from the center of the upper surface of the base 110 in the first direction 10 as a longitudinal direction. A linear motor (not shown) may be embedded in the slider 124, and the slider 124 may be linearly moved in the first direction 10 along the guide member 125 by the linear motor.

The gantry unit 130 supports a plurality of inkjet head modules 150. The gantry unit 130 may be provided above the path through which the support plate 121 is moved.

The gantry unit 130 may be spaced apart from the upper surface of the base 110 in the upward direction. Further, the gantry unit 130 may be arranged such that its longitudinal direction towards the second direction 20.

The gantry moving unit 140 linearly moves the gantry unit 130 in the first direction 10. The gantry moving unit 140 may include a first moving unit 141 and a second moving unit 142.

The first moving unit 141 may be provided at one end of the gantry unit 130, and the second moving unit 142 may be provided at the other end of the gantry unit 130. In this case, the first moving unit 141 slides along the first guide rail 211 provided on one side of the base 110, and the second moving unit 142 slides along the second guide rail 212 provided on the other side of the base 110 so that the gantry unit 130 may be linearly moved in the first direction 10.

The inkjet head module 150 discharges droplets such as ink on the substrate (S). The inkjet head module 150 may be installed on the side surface of the gantry unit 130 and supported by the gantry unit 130.

The inkjet head module 150 may linearly move in the longitudinal direction of the gantry unit 130, that is, in the second direction 20 by the head moving unit 160, and also may linearly move in the third direction 30. Further, the inkjet head module 150 may rotate about an axis parallel to the third direction 30 with respect to the head moving unit 160.

A plurality of inkjet head modules 150 may be provided on the gantry unit 130. Three inkjet head modules 150, for example, a first head unit 151, a second head unit 152, and a third head unit 153 may be provided. The plurality of inkjet head modules 150 may be coupled to the gantry unit 130 in a row, for example, in the second direction 20.

The inkjet head module 150 may include a plurality of nozzles (not shown) for discharging droplets and a nozzle plate (not shown), on which a plurality of nozzles are formed. For example, 128 nozzles or 256 nozzles may be provided to the inkjet head module 150.

The inkjet head module 150 may be provided with a number of piezoelectric elements corresponding to a plurality of nozzles. The droplet discharge amount of the plurality of nozzles may be independently adjusted by controlling the voltage applied to the piezoelectric element.

The head moving unit 160 linearly moves the inkjet head module 150. The head moving unit 160 may be provided in the printing process equipment 100 corresponding to the number of inkjet head modules 150. For example, when three inkjet head units 150 such as a first head unit 151, a second head unit 152, and a third head unit 153 are provided, three head moving units 160 may also be provided.

Meanwhile, a single head moving unit 160 may be provided, and in this case, the inkjet head module 150 may not move individually, but may move together at the same time.

The droplet discharge amount measurement unit 170 measures the droplet discharge amount of the inkjet head module 150. The droplet discharge amount measurement unit 170 may be arranged on one side of the substrate support unit 120 on the base 110.

The droplet discharge amount measurement unit 170 may measure the amount of droplets discharged from all nozzles for each inkjet head module 150. Through the measurement of the droplet discharge amount of the inkjet head module 150, it is possible to check macroscopically whether there are abnormalities in all nozzles of the inkjet head module 150. That is, when the droplet discharge amount of the inkjet head module 150 deviates from the reference value, it can be seen that at least one of the inkjet head modules 150 has an abnormality.

The inkjet head module 150 may be moved in the first direction 10 and the second direction 20 by the gantry moving unit 140 and the head moving unit 160 to be located above the droplet discharge amount measurement unit 170. The head moving unit 160 may move the inkjet head module 150 in the third direction 30 to adjust a vertical distance between the inkjet head module 150 and the droplet discharge amount measurement unit 170.

The nozzle inspection unit 180 checks whether or not an individual nozzle provided to the inkjet head module 150 is abnormal. The nozzle inspection unit 180 may check whether or not an individual nozzle is abnormal through, for example, optical inspection.

The nozzle inspection unit 180 macroscopically checks the abnormality of a nozzle in the droplet discharge amount measurement unit 170, and when it is determined that there is an abnormality in an unspecified nozzle, it can proceed a total inspection of the nozzle while checking the abnormality of an individual nozzle.

The nozzle inspection unit 180 may be arranged on one side of the substrate support unit 120 on the base 110. The inkjet head module 150 may be moved in the first direction 10 and the second direction 20 by the gantry moving unit 140 and the head moving unit 160 to be located above the nozzle inspection unit 180. The head moving unit 160 may move the inkjet head module 150 in the third direction 30 to adjust a vertical distance between the inkjet head module 150 and the nozzle inspection unit 180.

Meanwhile, the printing process equipment 100 may further include a droplet supply device 190.

The droplet supply device 190 may be installed on the upper and side portions of the gantry unit 130. The droplet supply device 190 may include a droplet supply module 191 and a pressure control module 192.

The droplet supply module 191 supplies liquid such as ink to the inkjet head module 150. After receiving the liquid from a storage tank (not shown) storing the liquid, the droplet supply module 191 may supply the liquid to the inkjet head module 150.

The pressure control module 192 controls the pressure of the droplet supply module 191. The pressure control module 192 may control the pressure of the droplet supply module 191 by providing positive pressure or negative pressure to the droplet supply module 191.

Meanwhile, the droplet supply module 191 and the pressure control module 192 may be coupled to the gantry unit 130.

Next, the head alignment apparatus will be described.

FIG. 3 is a conceptual diagram schematically showing the internal configuration of a head alignment apparatus according to an embodiment of the present invention.

According to FIG. 3, the head alignment apparatus 300 may include a reference position determining unit 310, a mounting position determining unit 320, a mounting position display unit 330, a power supply unit 340, and a main control unit 350.

The head alignment apparatus 300 is for aligning a plurality of inkjet head modules. The head alignment apparatus 300 may align a plurality of inkjet head modules in conjunction with an image sensor.

The head alignment apparatus 300 may be implemented as a device equipped with a processor having an arithmetic function and a control function in order to perform the above functions. The head alignment apparatus 300 may be implemented as, for example, a PC or a server.

The power supply unit 340 functions to supply power to each component constituting the head alignment apparatus 300. Further, the main control unit 350 functions to control the entire operation of each component constituting the head alignment apparatus 300.

A plurality of inkjet head modules 420a, 420b, . . . , 420n aligned by the head alignment apparatus 300 may be installed on a head transfer 410 as shown in FIG. 4. FIG. 4 is an exemplary view for describing a head transfer. The following description refers to FIG. 4.

The head transfer 410 supports a plurality of inkjet head modules 420a, 420b, . . . , 420n. The head transfer 410 may be installed on the bottom surface of the gantry unit 130 (that is, the surface facing the substrate (S)) with a plurality of inkjet head modules 420a, 420b, . . . , 420n mounted.

Each of the inkjet head modules 420a, 420b, . . . , 420n may include a plurality of nozzles so that droplets can be discharged. Each of the inkjet head modules 420a, 420b, . . . , 420n may be mounted on the head transfer 410 such that the nozzle towards downward direction (i.e., the third direction 30 of minus).

The plurality of inkjet head modules 420a, 420b, . . . , 420n may be arranged so that neighboring head modules are not side by side (e.g., in a zigzag form). However, this embodiment is not limited thereto. The plurality of inkjet head modules 420a, 420b, 420n may be arranged so that the neighboring head modules are side by side.

The plurality of inkjet head modules 420a, 420b, . . . , 420n may be arranged in two rows. However, this embodiment is not limited thereto. The plurality of inkjet head modules 420a, 420b, . . . , 420n may be arranged in one row or three or more rows.

The reference position determining unit 310 functions to determine a reference position. The reference position determining unit 310 may function to determine a reference position using an image sensor. The reference position determining unit 310 may use two image sensors 440 and 450, that is, a first image sensor 440 and a second image sensor 450, as shown in FIG. 5 to determine a reference position.

In this embodiment, before determining the positions of each of the inkjet head modules 420a, 420b, . . . , 420n mounted on the head transfer 410, the position of the head transfer 410 may be determined. The reference position determining unit 310 may determine the reference position as the position of the head transfer 410.

FIG. 5 is an exemplary view for describing the function of a reference position determining unit constituting the head alignment apparatus according to an embodiment of the present invention. The following description refers to FIG. 5.

When determining the reference position using the first image sensor 440 and the second image sensor 450, the reference position determining unit 310 may determine the reference position based on the position synchronization between the first image sensor 440 and the second image sensor 450.

FIG. 6 is a first exemplary view for describing a method of synchronizing positions between a first image sensor and a second image sensor. The following description refers to FIG. 6.

The first image sensor 440 may be arranged on a first side (a side parallel to the head transfer 410). In this case, the first image sensor 440 may be installed to be fixed to the side surface or bottom surface of the head transfer 410.

The second image sensor 450 may be arranged on a second side (a side facing the head transfer 410). The second image sensor 450 may be arranged to face the first image sensor 440. For example, the first image sensor 440 may be arranged to toward the substrate (S), and the second image sensor 450 may be arranged to toward the gantry unit 130.

The structure 460 is made of a transparent material and may be arranged between the first image sensor 440 and the second image sensor 450. The structure 460 may be, for example, a transparent glass substrate.

The mark 470 may be attached on the structure 460. The mark 470 may be attached to one surface of the structure 460 or may be attached to both surfaces of the structure 460. When the marks 470 are attached on both surfaces of the structure 460, they may be attached at positions corresponding to each other.

The mark 470 may have the same shape when viewed from the front and when viewed from the rear. The mark 470 may have, for example, a cross shape as shown in FIG. 7. However, this embodiment is not limited thereto. The mark 470 may have various shapes such as a polygonal shape, a circular shape, and an elliptical shape. FIG. 7 is a second exemplary view illustrating a method of synchronizing positions between a first image sensor and a second image sensor.

Next, a method of synchronizing positions between the first image sensor 440 and the second image sensor 450 will be described. FIG. 8 is a flowchart sequentially illustrating a method of synchronizing positions between a first image sensor and a second image sensor. The following description refers to FIG. 8.

First, the position of the structure 460 is fixed (S510).

Thereafter, a second image related to the mark 470 is obtained by photographing the mark 470 on the structure 460 using the second image sensor 450 (S520).

Thereafter, a first image related to the mark 470 is obtained by photographing the mark 470 on the structure 460 using the first image sensor 440 (S530).

Thereafter, the reference position determining unit 310 compares the first image and the second image to determine whether the first image is the same as the second image (S540).

The reference position determining unit 310 may determine whether the first image is the same as the second image based on whether the positions of the mark 470 on the images are the same. In the reference position determining unit 310, for example, as shown in FIG. 9, when the position of the mark 470 on the first image 480 and the position of the mark 470 on the second image 490 are the same, it may be determined that the first image 480 is the same as the second image 490, and as shown in FIG. 10, when the position of the mark 470 on the first image 480 and the position of the mark 470 on the second image 490 are not the same, it may be determined that the first image 480 is not the same as the second image 490. FIG. 9 is a third exemplary diagram for describing a method of synchronizing positions between a first image sensor and a second image sensor, and FIG. 10 is a fourth exemplary diagram for describing a method of synchronizing positions between a first image sensor and a second image sensor.

If it is determined that the first image is the same as the second image, the reference position determining unit 310 considers that the positions are synchronized between the first image sensor 440 and the second image sensor 450, and the position of the head transfer 410 is determined as the reference position (S550).

On the other hand, if it is determined that the first image is not the same as the second image, the reference position determining unit 310 considers that the positions between the first image sensor 440 and the second image sensor 450 are not synchronized, and moves the first image sensor 440 (S560). At this time, the head transfer 410, to which the first image sensor 440 is fixed, is also moved.

The reference position determining unit 310 repeatedly performs steps S530, S540, and S560 until the positions between the first image sensor 440 and the second image sensor 450 are synchronized.

It will be described again with reference to FIG. 3.

The mounting position determining unit 320 functions to determine the mounting position. When the position of the head transfer 410 is determined by the reference position determining unit 310, the position of each inkjet head module 420a, 420b, ..., 420n installed in the head transfer 410 should also be determined. The mounting position determining unit 320 may determine the mounting position as a reference position of the inkjet head modules 420a, 420b, ..., 420n.

The mounting position determining unit 320 may determine the position of each of the inkjet head modules 420a, 420b, ..., 420n based on the absolute spacing. When the first image sensor 440 is installed together with the plurality of inkjet head modules 420a, 420b, ..., 420n in the head transfer 410 as shown in FIG. 11, the first image sensor 440 may be spaced apart from the first inkjet head module 420a located at the nearest distance by the machine design processing value (k) and installed. At this time, this machine design processing value (k) may be an absolute spacing. FIG. 11 is a first exemplary view for describing the function of the mounting position determining unit constituting the head alignment apparatus according to an embodiment of the present invention.

When position synchronization is performed between the first image sensor 440 and the second image sensor 450, the position of the second image sensor 450 may be determined. As shown in FIG. 12, the mounting position determining unit 320 may move the second image sensor 450 from the current position by an absolute spacing (i.e., the machine design processing value (k)). In this case, the mounting position determining unit 320 may move the second image sensor 450 in the arrangement direction of the plurality of inkjet head modules 420a, 420b, ..., 420n. FIG. 12 is a second exemplary view for describing the function of the mounting position determining unit constituting the head alignment apparatus according to an embodiment of the present invention.

Meanwhile, the second inkjet head module 420b may be installed adjacent to the first inkjet head module 420a. In this case, the second inkjet head module 420b may also be installed spaced apart from the first inkjet head module 420a by a reference value. Here, the reference value may be a machine design processing value (k), but may be a value previously determined by the manufacturer. In a plurality of inkjet head modules 420a, 420b, . . . , 420n of the present embodiment, two adjacent inkjet head modules may be installed to be spaced apart by a reference value as described above. When a reference position is determined for the inkjet head module of a higher priority (e.g., the first inkjet head module 420a), the mounting position determining unit 320 may move the second image sensor 450 in the arrangement direction of the plurality of inkjet head modules 420a, 420b, . . . , 420n) by a reference value to determine a reference position for the inkjet head module of a lower priority (e.g., the second inkjet head module 420b).

On the other hand, the second inkjet head module 420b does not determine a reference position based on the distance from the first inkjet head module 420a (e.g., the machine design processing value (k)), but it is also possible to determine a reference position based on a distance from the head transfer 410 (e.g., a value corresponding to twice the machine design processing value (k)), like the first inkjet head module 420a.

It will be described again with reference to FIG. 3.

The mounting position display unit 330 functions to display the mounting position. When the reference position for each of the inkjet head modules 420a, 420b, 420n is determined, the respective inkjet head modules 420a, 420b, . . . , 420n should be moved from the current position to the reference position. In this embodiment, when the reference position of each of the inkjet head modules 420a, 420b, . . . , 420n is determined by the mounting position determining unit 320, a movement control member (e.g., a gauge, a motor, etc.) is used to move each of the inkjet head modules 420a, 420b, . . . , 420n from the current position to the reference position.

When the mounting position display unit 330 moves each of the inkjet head modules 420a, 420b, . . . , 420n from the current position to the reference position using the movement control member, the situation may be displayed on a monitor screen or the like.

The movement control member 610 may be installed on each of the inkjet head modules 420a, 420b, . . . , 420k, . . . , 420n as shown in FIG. 13. Each of the inkjet head modules 420a, 420b, . . . , 420k, . . . , 420n may be moved to a designated position by using the movement control member 610.

The movement control member 610 may move each of inkjet head modules 420a, 420b, . . . , 420k, . . . , 420n to a designated position by moving one side of each of inkjet head modules 420a, 420b, . . . , 420k, . . . , 420n while fixing its other side. However, this embodiment is not limited thereto. The movement control member 610 may move both sides of each of inkjet head modules 420a, 420b, . . . , 420k, . . . , 420n to move each of inkjet head modules 420a, 420b, . . . , 420k, . . . , 420n to a designated position.

In this embodiment, when moving each of the inkjet head modules 420a, 420b, . . . , 420k, . . . , 420n to a designated position, the specific nozzle in each inkjet head module 420a, 420b, . . . , 420k, . . . , 420n can be moved to a designated position. FIG. 13 is a first exemplary view for describing the function of a mounting position determining unit constituting the head alignment apparatus according to an embodiment of the present invention.

When using the movement control member, as shown in FIG. 14, the mounting position display unit 330 may visually display the current position 640 of each inkjet head module 420a, 420b, . . . , 420k, . . . , 420n 640 and the reference position 630 determined by the mounting position determining unit 320 on the monitor screen 620 at the same time. FIG. 14 is a second exemplary view for describing the function of the mounting position determining unit constituting the head alignment apparatus according to an embodiment of the present invention.

The mounting position display unit 330 visually simultaneously provides the reference position 630 and the current position 640 for each of the inkjet head modules 420a, 420b, . . . , 420k, . . . , 420n, thereby providing the operator's working guideline, and obtaining the effect that each inkjet head module 420a, 420b, . . . , 420k, . . . , 420n can be accurately mounted at the required position in the equipment. Further, the visually displayed reference position 630 is provided by calculating the spacing between the heads required for securing equipment performance, or by displaying the position where the quality-verified existing head was mounted on the work screen, thus making it easier to mount and replace the head. This technology may be provided as a technology that enables maintaining the quality of equipment in an inkjet facility, in which a plurality of heads are installed.

The head alignment apparatus 300 according to an embodiment of the present invention has been described above with reference to FIGS. 3 to 14. The head alignment apparatus 300 may determine a reference position when aligning a plurality of head modules in a printing process equipment, automatically calculate the mounting position of each head module from this, and visually display it on a monitor.

The head alignment apparatus 300 may determine a reference position by synchronizing the positions of the two cameras, calculate the mounting spacing of the head module required by the equipment from the reference position by software (SW) to determine the mounting position of each of the head modules, and display the (calculated) mounting position on the work monitor screen so that the head module can be mounted at the position necessary to secure performance.

When determining the reference position, the camera mounted on the head module and the camera mounted on the lower portion of the equipment may be synchronized to the same position in the vertical direction, and the corresponding position may be determined as the reference position. Further, when determining the mounting position of the head module, the two cameras may move from a synchronized reference position to a position required for mounting, and the corresponding position may be displayed on the operator's monitor screen.

The head alignment apparatus 300 may determine a reference position through two synchronized cameras through performing the above function. Further, the head alignment apparatus 300 determines the mounting position of the head module from the reference position so that the position of the individual head module can be adjusted. In addition, the head alignment apparatus 300 may check the mounting status of the head module in real time through a monitor while performing the mounting operation of the head module. In addition, the head alignment apparatus 300 may automatically calculate the mounting position of the head module by SW from the reference position, and mount the head module at a position necessary for securing performance.

Meanwhile, even when a plurality of head modules are mounted, the head modules are mounted so that the spacing between the head modules is the distance of an absolute position from the reference position, and even when the head module is replaced or remounted, the head module may be mounted at the same position.

Although the embodiments of the present invention have been described with reference to the above and the accompanying drawings, those of ordinary skill in the art to which the present invention pertains can understand that it may be implemented in other specific forms without changing the technical spirit or essential features of the present invention. Therefore, it should be understood that the embodiments described above are illustrative and non-limiting in all respects.

What is claimed is:

1. An apparatus for aligning a head comprising:
   a reference position determining unit for determining a first reference position of a head transfer, in which a plurality of inkjet head modules are installed; and
   a mounting position determining unit for determining a second reference position of the inkjet head module based on the first reference position so that the inkjet head module can be moved from a current position to the second reference position,
   wherein the reference position determining unit determines the first reference position using a first image sensor installed on the same plane as the inkjet head module and a second image sensor installed facing the inkjet head module.

2. The apparatus of claim 1, wherein the reference position determining unit determines the first reference position based on position synchronization between the first image sensor and the second image sensor.

3. The apparatus of claim 1, wherein the reference position determining unit determines the first reference position using a structure having a mark attached to a surface of the structure.

4. The apparatus of claim 3, wherein the structure is arranged between the first image sensor and the second image sensor when synchronizing between a position of the first image sensor and a position of the second image sensor.

5. The apparatus of claim 3, wherein the structure is made of a transparent material.

6. The apparatus of claim 1, wherein the first image sensor acquires a first image of a structure having a mark attached to a surface of the structure,
   wherein the second image sensor acquires a second image of the structure,
   wherein the reference position determining unit determines the first reference position based on whether the first image is the same as the second image.

7. The apparatus of claim 6, wherein the reference position determining unit compares a position of the mark on the first image and a position of the mark on the second image to determine whether the first image is the same as the second image.

8. The apparatus of claim 7, wherein the reference position determining unit moves the first image sensor to determine the first reference position if the first image is not the same as the second image.

9. The apparatus of claim 1, wherein the mounting position determining unit determines the second reference position by adding a first reference value to the first reference position.

10. The apparatus of claim 1, wherein the mounting position determining unit determines, based on a second reference position of one of a plurality of inkjet head modules, a second reference position of other inkjet head module.

11. The apparatus of claim 10, wherein the mounting position determining unit determines a second reference position of the other inkjet head module by adding a second reference value to the second reference position of the one of a plurality of inkjet head modules.

12. The apparatus of claim 1 further comprises,
    a mounting position display unit for visually displaying the current position and the second reference position when the inkjet head module is moved from the current position to the second reference position.

13. The apparatus of claim 12, wherein the mounting position display unit simultaneously displays the current position and the second reference position on one screen.

14. An apparatus for aligning a head comprising:
    a reference position determining unit for determining a first reference position of a head transfer, in which a plurality of inkjet head modules are installed; and
    a mounting position determining unit for determining a second reference position of the inkjet head module based on the first reference position so that the inkjet head module can be moved from a current position to the second reference position,
    wherein the reference position determining unit determines the first reference position based on position synchronization between a first image sensor installed on the same plane as the inkjet head module and a second image sensor installed facing the inkjet head module,
    wherein the reference position determining unit, when a first image of a structure arranged between the first image sensor and the second image sensor is acquired by the first image sensor, and a second image of the structure is acquired by the second image sensor, determines whether the first image is the same as the second image based on positions of the mark on the images.

15. A system for treating a substrate comprising:
    a base;
    a substrate support member installed on the base and for supporting a substrate to be printed;
    a gantry unit installed to be movable on the substrate support member, in which a head transfer including a plurality of inkjet head modules for discharging a droplet on the substrate is installed; and
    a head alignment apparatus for aligning the inkjet head module,
    wherein the head alignment apparatus comprises,
    a reference position determining unit for determining a first reference position of the head transfer; and
    a mounting position determining unit for determining a second reference position of the inkjet head module based on the first reference position so that the inkjet head module can be moved from a current position to the second reference position,
    wherein the reference position determining unit determines the first reference position using a first image sensor installed on the same plane as the inkjet head module and a second image sensor installed facing the inkjet head module.

16. The system of claim 15, wherein the reference position determining unit determines the first reference position based on position synchronization between the first image sensor and the second image sensor.

17. The system of claim 15, wherein the first image sensor acquires a first image of a structure having a mark is attached to a surface of the structure,
wherein the second image sensor acquires a second image of the structure,
wherein the reference position determining unit compares a position of the mark on the first image and a position of the mark on the second image to determine whether the first image is the same as the second image, and determines the first reference position based on whether the first image is the same as the second image.

18. The system of claim 15, wherein the mounting position determining unit determines the second reference position by adding a first reference value to the first reference position.

19. The system of claim 15, wherein the mounting position determining unit determines, based on a second reference position of one of a plurality of inkjet head modules, a second reference position of other inkjet head module.

20. The system of claim 15, wherein the head alignment apparatus further comprises a mounting position display unit for visually displaying the current position and the second reference position when the inkjet head module is moved from the current position to the second reference position.

* * * * *